US008971180B2

(12) United States Patent
Fryer et al.

(10) Patent No.: US 8,971,180 B2
(45) Date of Patent: Mar. 3, 2015

(54) POOLING AVAILABLE NETWORK BANDWIDTH FROM MULTIPLE DEVICES

(75) Inventors: Todd Fryer, Liberty, MO (US); David Irvin, Baldwin City, KS (US); Nicholas Nicas, Blue Springs, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 380 days.

(21) Appl. No.: 13/311,462

(22) Filed: Dec. 5, 2011

(65) Prior Publication Data
US 2013/0142040 A1 Jun. 6, 2013

(51) Int. Cl.
*H04L 1/00* (2006.01)
*H04L 12/26* (2006.01)
*H04J 3/16* (2006.01)
*H04J 3/04* (2006.01)
*G06Q 20/00* (2012.01)
*H04L 27/00* (2006.01)
*H04L 12/40* (2006.01)

(52) U.S. Cl.
CPC ...... *H04L 27/0006* (2013.01); *H04L 12/40065* (2013.01)
USPC ............ 370/230; 370/17; 370/232; 370/252; 370/468; 370/535; 705/77

(58) Field of Classification Search
CPC ............ H04L 12/2863; H04L 41/0896; H04L 47/783; H04L 2012/5632; H04L 12/2439; H04W 84/18; H04W 28/18
USPC ............ 370/17, 232, 252, 468, 535; 709/204; 705/77
See application file for complete search history.

(56) References Cited

U.S. PATENT DOCUMENTS 5,546,379 A * 8/1996 Thaweethai et al. .......... 370/254
7,688,730 B2 * 3/2010 Beadle .......................... 370/232
(Continued)

FOREIGN PATENT DOCUMENTS

WO WO 9951001 A1 * 10/1999 ............. H04L 12/56

OTHER PUBLICATIONS

Kear, Sam, "Dual Wan Router—How to Load Balance Using pfSen," http://skear.hubpages.com/hub/Dual-Wan-Router-How-To-Build-One-On-a-Budget, accessed on Nov. 29, 2011 (7 pages).
Vicomsoft, "Bandwidth Aggregation, Bonding and Teaming," http://www.vicomsoft.us/learning-center/bandwidth-aggregation-bonding-and-teaming/, accessed on Nov. 29, 2011 (11 pages).
(Continued)

*Primary Examiner* — Jung Park
*Assistant Examiner* — Chuong M Nguyen
(74) *Attorney, Agent, or Firm* — Hanley, Flight & Zimmerman, LLC (57) ABSTRACT

Methods, apparatus and articles of manufacture for pooling available network bandwidth from multiple devices are disclosed. An example method disclosed herein comprises registering, at a router, availability of a first device, the first device to provide access to first wide area network bandwidth provided by a first wide area network, after registering the availability of the first device, including the first wide area network bandwidth in a network bandwidth pool accessible via the router when a pooling configuration parameter associated with the first device is determined to be valid, the network bandwidth pool including second wide area network bandwidth accessible via a second device registered with the router, the second device being different from the first device, and allocating at least a portion of the network bandwidth pool to route Internet protocol traffic associated with a third device.

20 Claims, 6 Drawing Sheets

(56) References Cited

U.S. PATENT DOCUMENTS

| | | | |
|---|---|---|---|
| 7,860,081 | B2 | 12/2010 | Dawson et al. |
| 7,894,470 | B2 | 2/2011 | Ruckart |
| 7,894,828 | B2 | 2/2011 | Dawson et al. |
| 8,068,450 | B2 | 11/2011 | Kozisek |
| 8,170,056 | B2 * | 5/2012 | Allen et al. ............... 370/468 |
| 2002/0004788 | A1 | 1/2002 | Gros et al. |
| 2002/0091843 | A1 | 7/2002 | Vaid |
| 2005/0021621 | A1 * | 1/2005 | Welch et al. ............... 709/204 |
| 2006/0070115 | A1 | 3/2006 | Yamada et al. |
| 2006/0168290 | A1 | 7/2006 | Doron |
| 2007/0050522 | A1 | 3/2007 | Grove et al. |
| 2007/0127386 | A1 | 6/2007 | Joshi et al. |
| 2007/0136452 | A1 | 6/2007 | Coleman |
| 2007/0147438 | A1 * | 6/2007 | Lok ............... 370/535 |
| 2008/0075111 | A1 | 3/2008 | Hu et al. |
| 2008/0175188 | A1 | 7/2008 | Kozisek |
| 2008/0262974 | A1 * | 10/2008 | Kozisek ............... 705/77 |
| 2008/0301017 | A1 | 12/2008 | Dawson et al. |
| 2009/0046740 | A1 * | 2/2009 | Ruckart ............... 370/468 |
| 2010/0061401 | A1 * | 3/2010 | Nakahira ............... 370/468 |
| 2010/0287296 | A1 | 11/2010 | Riggert et al. |
| 2010/0318662 | A1 | 12/2010 | Wie et al. |
| 2011/0110324 | A1 | 5/2011 | Ruckart |
| 2013/0114426 | A1 * | 5/2013 | Polk et al. ............... 370/252 |
| 2014/0040364 | A1 | 2/2014 | Baldwin et al. |
| 2014/0040421 | A1 | 2/2014 | Baldwin |
| 2014/0040493 | A1 | 2/2014 | Baldwin |

OTHER PUBLICATIONS

Wikipedia, "Stackable switch," http://en.wikipedia.org/wiki/Stackable_switch, accessed on Nov. 29, 2011 (3 pages).

Adtran, Inc., "Why Buy ATLAS Video Switch, ATLAS 800 Series," Mar. 2004 (2 pages).

Wikipedia, "Channel Bonding," http://en.wikipedia.org/wiki/Channel_bonding, accessed on Apr. 10, 2012 (2 pages).

Wikipedia, "Link Aggregation," http://en.wikipedia.org/wiki/Link_aggregation, accessed on Apr. 10, 2012 (8 pages).

United States Patent and Trademark Office, "Non-Final Office Action", issued in connection with U.S. Appl. No. 13/563,218 dated Jan. 23, 2014 (18 pages).

United States Patent and Trademark Office, "Final Office Action", issued in connection with U.S. Appl. No. 13/563,218 dated Aug. 20, 2014 (19 pages).

United States Patent and Trademark Office, "Non-Final Office Action", issued in connection with U.S. Appl. No. 13/563,225 dated Aug. 28, 2014 (15 pages).

United States Patent and Trademark Office, "Non-Final Office Action", issued in connection with U.S. Appl. No. 13/563,234 dated Apr. 17, 2014 (13 pages).

United States Patent and Trademark Office, "Final Office Action", issued in connection with U.S. Appl. No. 13/563,234, dated Sep. 29, 2014 (11 pages).

* cited by examiner

FIG. 7

POOLING AVAILABLE NETWORK BANDWIDTH FROM MULTIPLE DEVICES

FIELD OF THE DISCLOSURE

This disclosure relates generally to networking and, more particularly, to pooling available network bandwidth from multiple devices.

BACKGROUND

Many consumer and business local area networks (LANs) utilize a single wide area network (WAN) link provided by a single WAN service provider, such as a digital subscriber line (DSL) provider, a cable service provider, a satellite service provider, a wireless/cellular service provider, an Internet service provider (ISP), T-1 service provider, etc., to gain access to a back-end, service-oriented network, such as the Internet. However, a single WAN link may have insufficient bandwidth or, in other words, insufficient data throughput to support the data traffic requirements for LAN client devices, such as when multiple LAN client devices (e.g., computers, set-top boxes, gaming consoles, etc.) attempt to access data-intensive services (e.g., such as on-demand streaming video, multi-user gaming, web surfing, etc.) simultaneously via the single WAN link. Prior techniques to increase available WAN bandwidth for client devices on a LAN include techniques that combine multiple WAN links that are to provide WAN access for the LAN client devices. However, such prior techniques for combining multiple WAN links have been limited to, for example, fixed bonding or aggregation of WAN links that are implemented using the same WAN access technology and/or provided by the same WAN service provider.

DETAILED DESCRIPTION

Methods, apparatus and articles of manufacture for pooling available network bandwidth from multiple devices are disclosed herein. Example methods disclosed herein for network bandwidth pooling include registering availability of a first device (e.g., a first contributing device as described in greater detail below) at a router in response to the router detecting the first device. The first device is able to provide access to first wide area network bandwidth provided by a first wide area network. In some examples, the method detects the first device when the first device becomes communicatively coupled with the router. For example, if the first device is a mobile device, the method may detect the first device when the first device enters a wireless coverage area of the router.

After registering the availability of the first device, disclosed example methods then include the first wide area network bandwidth in a network bandwidth pool, which is accessible via the router, when a pooling configuration parameter associated with the first device is determined to be valid. However, in some examples, the method may not include the first network bandwidth in the network bandwidth pool when the pooling configuration parameter associated with the first device is determined to not be valid. The network bandwidth includes, for example, second wide area network bandwidth accessible via a second device (e.g., a second contributing device as described in greater detail below) registered with the router, with the second device being different from the first device. In some examples, the second wide area network bandwidth is provided by a second wide area network different from the first wide area network. Disclosed example methods further include allocating at least a portion of the network bandwidth pool to route Internet protocol traffic associated with a third device (e.g., a client device as described in greater detail below).

In some examples, the first device is enrolled with the router before the router is to detect and register the availability of the first device. For example, enrolling the device may include storing identification information to identify the first device, and storing the pooling configuration parameter associated with the first device. In some examples, multiple pooling configuration parameters can be associated with the first device during enrollment. Such example methods may include the first wide area network bandwidth, which is accessible via the first device, in the network bandwidth pool when, for example, any one of the multiple pooling configuration parameters associated with first device is determined to be valid, or all of the multiple pooling configuration parameters associated with first device are determined to be valid, or a subset of the multiple pooling configuration parameters associated with first device are determined to be valid, etc. In some examples, subsequent enrollment procedure(s) can be performed to add, remove and/or revise one or more pooling configuration parameters associated with the first device.

Example pooling configuration parameters that can be associated with first device (or any contributing device) are disclosed herein. An example pooling configuration parameter specifies that the first wide area network bandwidth accessible via the first device is to be included in the network bandwidth pool if the second device is at least one of not registered with the router or is determined to be in an off state. Another such example pooling configuration parameter specifies that the first wide area network bandwidth accessible via the first device is to be included in the network bandwidth pool if the second device is registered with the router and is determined to be in an on state. Yet another such example pooling configuration parameter specifies that the first wide area network bandwidth accessible via the first device is to be included in the network bandwidth pool if the second device has exceeded a number of packets limit associated with the second device. A further example pooling configuration parameter specifies that the first wide area network bandwidth accessible via the first device is to be included in the network bandwidth pool if the second device has met or exceeded a throughput capacity limit associated with the second device. Yet a further example pooling configuration parameter specifies that the first wide area network bandwidth accessible via the first device is to be included in the network bandwidth pool if packet routing latency associated with the first device is at least one of (1) within an acceptable limit or (2) better than packet routing latency associated with the second device.

Another example pooling configuration parameter specifies that the first wide area network bandwidth accessible via the first device is to be included in the network bandwidth pool if a current time is within a time-of-day range. Yet another example pooling configuration parameter specifies that the first wide area network bandwidth accessible via the first device is to be included in the network bandwidth pool if the Internet protocol traffic to be routed for the third device meets a priority level. A further example pooling configuration parameter specifies that the first wide area network bandwidth accessible via the first device is to be included in the network bandwidth pool if at least one of (1) a per timeframe packet capacity limit associated with the first device has not been exceeded or (2) a per session packet capacity limit associated with the first device has not been exceeded. A still further example pooling configuration parameter specifies that the first wide area network bandwidth accessible via the first device is to be included in the network bandwidth pool if the first device passes a throughput test. Other pooling configuration parameters and/or combinations of the above and/or other pooling configuration parameters can be employed by example methods, apparatus and articles of manufacture disclosed herein for pooling available network bandwidth from multiple devices.

Many consumer and business LANs utilize a single WAN link, such as a single DSL link, cable modem link, satellite modem link, wireless access point, T-1 link, etc., from a single service provider to provide WAN access to a back-end, service-oriented network, such as the Internet. However, a single WAN link may have insufficient bandwidth/data throughput to support the data traffic requirements for the client devices connected to a LAN. Prior techniques that employ link bonding or aggregation to combine WAN links to increase WAN bandwidth/data throughput can be limited in that they require the WAN links being combined to be implemented using the same WAN access technology. For example, such techniques may be limited to bonding multiple WAN links only if they are DSL links provided by the same service provider. Additionally, such bonding/aggregation is typically fixed, or static, and involves manual combining of WAN links that are expected to be present and unchanging over time.

In contrast to such prior techniques, example methods, apparatus and articles of manufacture disclosed herein enable automated and flexible pooling of WAN bandwidth that is available from multiple, different contributing devices supporting the same or different types of WAN links provided by the same or different WAN service providers. Example methods, apparatus and articles of manufacture disclosed herein can automatically update and prioritize the WAN bandwidth being pooled from different contributing devices as contributing devices enter and leave an operating environment. As described in greater detail below, the contributing devices that provide WAN bandwidth for pooling can include any type of device having an accessible WAN connection, such as a smartphone or other mobile phone, a personal digital assistant (PDA), a tablet computer, an e-reader, a wireless access point, a cable/satellite modem, a personal computer, etc. As such, bandwidth pooling as disclosed herein can enable efficient use of unused (and possible wasted) WAN bandwidth accessible via the contributing devices to thereby increase the available WAN bandwidth for any, some or all client devices (which may also be contributing devices) in the operating environment.

Figure 1:
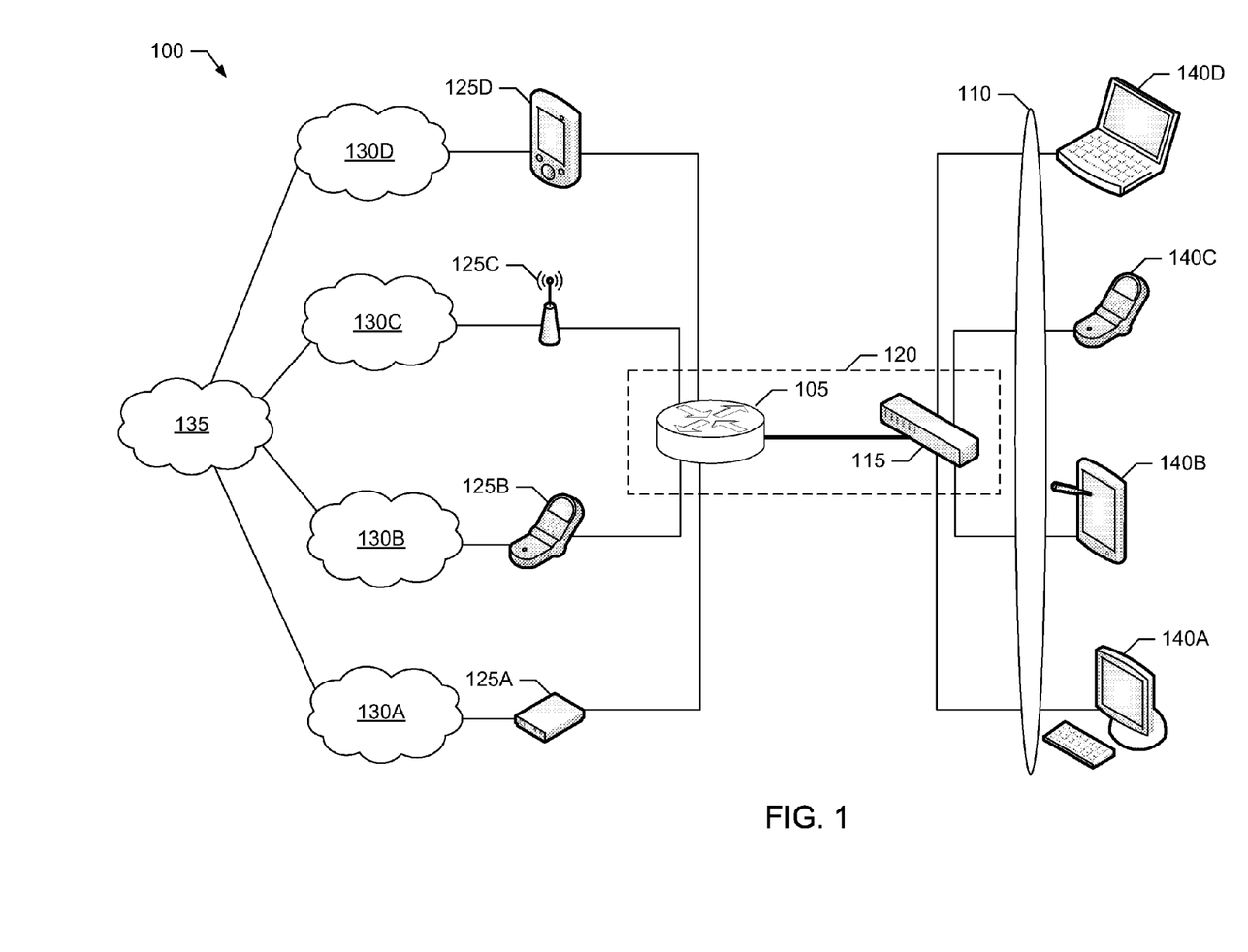
FIG. 1 is block diagram of an example system capable of pooling available network bandwidth from multiple devices as disclosed herein.

Turning to the figures, a block diagram of an example system 100 capable of pooling available network bandwidth from multiple devices as disclosed herein is illustrated in FIG. 1. The system 100 of the illustrated example includes an example pooling router 105 to pool available network bandwidth, such as available (e.g., idle) WAN bandwidth, that is accessible via one or more contributing devices in communication with the pooling router 105. In the example system 100 of FIG. 1, the pooling router 105 makes the pooled network bandwidth, also referred to as the network bandwidth pool, available to client devices of an example LAN 110 implemented by an example LAN bridge 115. In some examples, the pooling router 105 and the LAN bridge 115 are implemented as separate devices, whereas in other examples the pooling router 105 and the LAN bridge 115 are integrated into a single device, such as an example network router 120 as illustrated in FIG. 1.

By way of example, the system 100 of FIG. 1 includes four (4) example contributing devices 125A-D, which are devices capable of contributing available WAN bandwidth to the WAN bandwidth pool managed by the pooling router 105. For example, a contributing device can be a device that is capable of providing WAN access to other external device(s), such as via tethering and/or any external data connection (such as a Wi-Fi connection, a Bluetooth connection, a universal serial bus (USB) connection, a docking connection, etc.). In the illustrated example, the contributing devices 125A-D include an example broadband modem 125A (such as a DSL modem, a cable modem, a satellite modem, etc.), an example mobile phone 125B (such as a smartphone, a cellular phone, a 3G, 4G or long term evolution (LTE) wireless device, etc.), an example wireless access point 125C (such as a Wi-Fi device, a Bluetooth device, an aircard, etc.) and an example personal data device 125D (such as a PDA, an e-reader, etc.). The contributing devices 125A-D are able to access respective example WANs 130A-D, which in turn provide access to am example back-end network 135, which may correspond to any type of service-oriented network, such as the Internet.

For example, the WAN 130A that is accessible by the broadband modem 125A may correspond to a WAN provided by a DSL service provider, a cable service provider, a satellite service provider, etc. As another example, the WAN 130B that is accessible by the mobile phone 125B may correspond to a WAN provided by a wireless/cellular service provider. As yet another example, the WAN 130C that is accessible by the wireless access point 125C may correspond to a WAN provided by a DSL service provider, a cable service provider, a satellite service provider, a wireless/cellular service provider, etc. As yet a further example, the WAN 130D that is accessible by the personal data device 125D may correspond to a WAN provided by a DSL service provider, a cable service provider, a satellite service provider, a wireless/cellular service provider, etc. In view of the foregoing examples, in some examples the WANs 130A-D may correspond to different WANs provided by different service providers, whereas in other examples some or all of the WANs 130A-D may correspond to a single WAN provided by a single service provider. Furthermore, although four contributing devices 125A-D and four respective WANs 130A-D are illustrated in the example of FIG. 1, the system 100 can support more of fewer contributing devices 125A-D and/or more or fewer WANs 130A-D. Also, although one back-end network 135 is illustrated in the example of FIG. 1, the system 100 can support any number of back-end networks 135.

As mentioned above, the LAN switch 115 in the system 100 of the illustrated example implements a LAN 110 to which one or more client devices (also referred to herein as LAN client devices) may connect. By way of example, the system 100 of FIG. 1 includes four (4) example client devices 140A-D that are connected to the LAN 110 that is implemented by the LAN switch 110, which may correspond to any type of LAN switch, bridge, router, etc. In the illustrated example, the client devices 140A-D include an example computer 140A (such as a desktop computer, a server, etc.), an example personal data device 140B (such as a PDA, an e-reader, etc.), and example mobile phone 140C (such as a smartphone, a cellular phone, etc.), an example portable computer 140D (such as a notebook computer, a laptop computer, etc.). The client devices 140A-D connect or, in other words, communicatively couple with the LAN switch 115 and, thus, the LAN 110 via any type(s) of communication link(s), such as one or more cabled links (such as Ethernet links and/or USB links), one or more wireless links (such as Wi-Fi links and/or Bluetooth links), etc.

As mentioned above, the pooling router 105 is included in the example system 100 to pool available (e.g., idle) WAN bandwidth from the WANs 130A-D that is accessible via the contributing devices 125A-D. As such, the contributing devices 125A-D connect or, in other words, communicatively couple with the pooling router 105 via any type(s) of communication link(s), such as one or more cabled links (such as Ethernet links), one or more wireless links (such as Wi-Fi links and/or Bluetooth links), etc., to route traffic between the pooling router 105 and the back-end network 135 via the contributing devices 125A-D and the respective WANs 130A-D. The pooling router 105 is, in turn, connected or, in other words, communicatively coupled with the LAN switch 115 via any type(s) of communication link(s), such as one or more cabled links (such as Ethernet links and/or USB links), one or more wireless links (such as Wi-Fi links and/or Bluetooth links), etc., to route traffic between the LAN client devices 140A-D and the back-end network 135 via the LAN switch 115, the pooling router 105, the contributing devices 125A-D and the respective WANs 130A-D.

To route data traffic, such as Internet protocol (IP) traffic for a particular one of the client devices 140A-D, such as client device 140A, the pooling router 105 allocates at least a portion of the pool of available WAN bandwidth (which is provided by one or more of the contributing devices 125A-D) to the client device 140A. In some examples, the pooling router 105 employs any appropriate load balancing technique, rate limiting technique, bandwidth limiting technique, etc., to determine the portion of the WAN bandwidth pool to be allocated to the client device 140A. Furthermore, in some examples, the pooling router 105 may allocate bandwidth from the WAN bandwidth pool that is accessible by particular one(s) of the contributing devices 125A-D in accordance with one of more pooling configuration parameters (e.g., to enforce one or more preferences and/or priorities for allocating the pooled WAN bandwidth). As such, in some examples, the pooling router 105 may select WAN bandwidth provided by a particular one (or more) of the contributing devices 125A-D for allocation to the client device 140A, whereas in other examples the pooling router 105 may select WAN bandwidth agnostically (e.g., from any one or more of the contributing devices 125A-D) based on some other selection scheme (such as random selection, round-robin selection, etc.).

In some examples, the pooling router 105 employs an enrollment procedure to enroll each of the contributing devices 125A-D, such as the contributing device 125A, for possible inclusion in the WAN bandwidth pool managed by the pooling router 105. An example enrollment procedure for enrolling a particular one of the contributing devices 125A-D, such as the contributing device 125A, includes prompting a user to enter or otherwise specify device identification information, such as an Ethernet medium access control (MAC) address, a device identifier, etc., that uniquely identifies the contributing device 125A and that can be signaled or otherwise sent from the contributing device 125A to the pooling router 105 (e.g., during a registration procedure). In some examples, the enrollment procedure also includes prompting a user to enter or otherwise specify one or more pooling configuration parameters to be associated with the contributing device 125A. For example, the WAN bandwidth that is accessible by the contributing device 125A (or any of the other contributing devices 125A-D) may be made available through a user subscription policy that is particular to the specific contributing device 125A. As such, different available WAN bandwidths that are accessible from different contributing devices 125A-D may be associated with different costs, qualities of service, capacities, etc. In such example, the pooling configuration parameter(s) specified for the different contributing devices 125A-D can be used to specify preferences, priorities, etc., for including the available WAN bandwidths provided by these contributing devices 125A-D in the WAN bandwidth pool managed by the pooling router 105. Example pooling configuration parameter(s) are described in greater detail below.

After the contributing device 125A is enrolled, the pooling router 105 is then able to detect the presence of the contributing device 125A and register that availability of the contributing device 125A with the pooling router 105. For example, the pooling router 105 can detect the presence of the particular contributing device 125A automatically via any appropriate technique when the contributing device 125A physically connects to the pooling router 105, enters the wireless coverage area of the pooling router 105, or otherwise becomes communicatively coupled with the pooling router 105. Upon detecting the contributing device 125A, the pooling router 105 can then register the contributing device 125A by, for example, comparing device identification information signaled or otherwise received from the contributing device 125A with the stored device identification information obtained during the enrollment procedure.

After the contributing device 125A (or any other of the contributing devices 125A-D) is registered, the pooling router 105 of the illustrated example can then evaluate the pooling configuration parameter(s) associated with the registered contributing device 125A and any other registered contributing device(s) 125B-D to determine whether the available WAN bandwidth(s) from one or more, or all, of the contributing devices 125A-D is to be included in the WAN bandwidth pool to be allocated to the LAN client devices 140A-D. In some examples, the pooling router 105 evaluates the pooling configuration parameter(s) associated with the registered contributing device(s) 125A-D (to determine which contributing devices are to contribute available WAN bandwidth to be included in the WAN bandwidth pool) whenever the set of registered contributing device(s) 125A-D changes (e.g., due to registering a device or deregistering a device). Additionally or alternatively, in some examples, the pooling router 105 evaluates the pooling configuration parameter(s) associated with the registered contributing device(s) 125A-D (to determine which contributing devices are to contribute available WAN bandwidth to be included in the WAN bandwidth pool) whenever allocation of the pooled WAN bandwidth is to be performed for a LAN client device 140A-D (e.g., in response to an allocation request received from or otherwise associated with the LAN client device 140A-D). Additionally or alternatively, in some examples, the pooling router 105 evaluates the pooling configuration parameter(s) associated with the registered contributing device(s) 125A-D (to determine which contributing devices are to contribute available WAN bandwidth to be included in the WAN bandwidth pool) based on a schedule, at periodic or aperiodic time intervals, etc.

In some examples, one or more of the contributing devices 125A-D may also be client device(s) that are communicatively coupled to the LAN 110. In such examples, a contributing device that is also a LAN client device is capable of requesting that the pooling router 105 allocate at least a portion of the WAN bandwidth pool for routing data traffic for the contributing device. Such a contributing device may, therefore, be able to send/receive data traffic via a WAN that is different from its respective WAN via which it usually is to gain access to the back-end network 135 (and for which it is contributing available WAN bandwidth to the WAN bandwidth pool). For example, the mobile phone 125B, which is a contributing device providing available WAN bandwidth associated with the WAN 130B to the WAN bandwidth pool managed by the pooling router 105, may also connect to the LAN switch 115 (e.g., via a Wi-Fi or Bluetooth interface) and be included in the LAN 110 when the mobile phone 125B enters the coverage area of the LAN switch 115. In such an example, the pooling router 105 may allocate available WAN bandwidth provided by the contributing devices 125A, C and D, and which is associated with the WANs 130A, C and/or D, to the mobile phone 125B, which may be in addition or as an alternative to the WAN bandwidth from the WAN 130B that is already available to the mobile phone 125B. In this way, the pooling router 105 can redistribute the pooled WAN bandwidth to contributing devices, as well as client devices, to make efficient use of the available (e.g., idle) WAN bandwidth in the system 100.

Although the example system 100 has been described as supporting pooling of WAN bandwidth accessible via the contributing devices 125A-D, the system 100 and, in particular, the example pooling router 105 can be used to pool other resources of the contributing devices 125A-D in addition or as an alternative to their available WAN bandwidth. For example, the pooling router 105 could be used to pool resources such as computing capacity, memory capacity, services, other type(s) of network bandwidth, etc., provided or otherwise accessible via the contributing devices 125A-D for use by client device(s), such as the client devices 140A-D.

Figure 2:
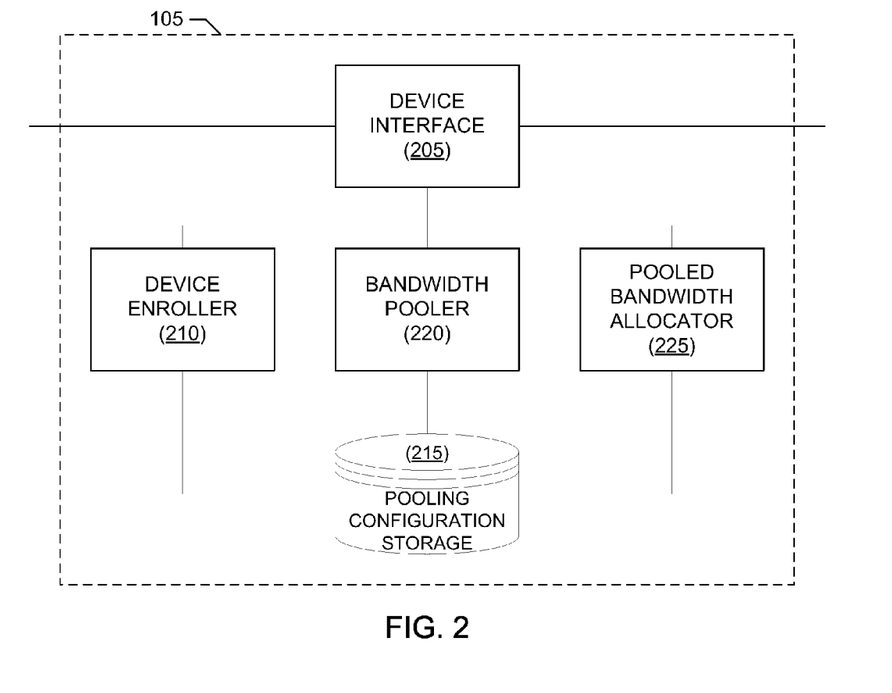
FIG. 2 is a block diagram of an example router to pool wide area network bandwidth provided by different devices in the example system of FIG. 1.

A block diagram of an example implementation of the pooling router 105 of FIG. 1 is illustrated in FIG. 2. The example pooling router 105 of FIG. 2 includes an example device interface 205 to communicate with contributing device(s), such as the contributing devices 125A-D, to enable the pooling router 105 to manage pooling of available (e.g., idle) WAN bandwidth that is accessible via the contributing device(s). The device interface 205 also communicates with client device(s), such as the client devices 140A-D, directly or indirectly (e.g., via the LAN bridge 115) to enable the pooling router 105 to allocate the pooled WAN bandwidth to route traffic (e.g., IP traffic) for the client device(s). As such, the device interface 205 implements any number(s) and type(s) of interfaces, such as, but not limited to, one or more wireless links (such as one or more Wi-Fi links and/or Bluetooth links), one or more cabled links (such as Ethernet links and/or USB links), etc., or any combination thereof.

The example pooling router 105 of FIG. 2 also includes an example device enroller 210 to enroll contributing device(s), such as the contributing devices 125A-D, for possible inclusion in the WAN bandwidth pool managed by the pooling router 105. In some examples, the device enroller 210 implements a graphical user interface (GUI) presented at a remote device via, for example, a web browser, a client application, etc., to prompt a user to enter or otherwise specify device identification information, as described above, for a contributing device to be enrolled with the pooling router 105. The device enroller 210 stores the specified device identification information for use when registering the contributing device for purposes of WAN bandwidth pooling. The device enroller 210 also enables the user to enter or otherwise specify one or more pooling configuration parameters to be associated with the contributing device. For example, the device enroller 210 can store the pooling configuration parameters(s) along with or otherwise linked to the device identification information that is stored for the enrolled contributing device.

An example pooling configuration storage 215 is included in the pooling router 105 of the illustrated example to store the device identification information and pooling configuration parameters(s) for enrolled contributing device(s). The pooling configuration storage 215 can store the device identification information and pooling configuration parameters(s) using any type of data format and/or structure, such as using one or more data tables, data arrays, databases, etc. The pooling configuration storage 215 can be implemented by any type or combination of temporary and/or permanent tangible storage media, such as one or more of cache, volatile memory, flash memory, disk storage, etc., including but not limited to one or more of the mass storage devices 730 and/or volatile memory 718 in the example processing system 700 of FIG. 7, which is described in greater detail below.

Example pooling configuration parameters(s) that can be specified when enrolling contributing device(s) and subsequently used by the pooling router 105 to manage bandwidth pooling are listed in Table 1.

TABLE 1

| Parameter Number | Description |
| --- | --- |
| P1 | WAN bandwidth of this contributing device is usable if other contributing devices are OFF |
| P2 | WAN bandwidth of this contributing device is usable if other contributing devices are ON |
| P3 | WAN bandwidth of this contributing device is usable if other contributing devices have met or exceeded their WAN packet limits (which are specified, selectable, signaled, etc.) |
| P4 | WAN bandwidth of this contributing device is usable if other contributing devices have met or exceeded their WAN throughput capacities (which are specified, selectable, signaled etc.) |
| P5 | WAN bandwidth of this contributing device is usable if the contributing device's WAN packet latency is within a limit (e.g., which is specified, selectable, signaled etc.) |
| P6 | WAN bandwidth of this contributing device is usable if a current time is within a time-of-day range (e.g., which is specified, selectable, signaled, etc.) |
| P7 | WAN bandwidth of this contributing device is usable if the IP traffic to be routed meets a priority level (e.g., which is specified, selectable, signaled, etc.) |
| P8 | WAN bandwidth of this contributing device is usable if the contributing device's packet latency is better than packet routing latencies for the other |

TABLE 1-continued

| Parameter Number | Description |
| --- | --- |
| | contributing devices |
| P9 | WAN bandwidth of this contributing device is usable if the contributing device's per timeframe WAN packet capacity limit (e.g., which is specified, selectable, signaled, etc.) has not been exceeded |
| P10 | WAN bandwidth of this contributing device is usable if the contributing device's per session WAN packet capacity limit (e.g., which is specified, selectable, signaled, etc.) has not been exceeded |
| P11 | WAN bandwidth of this contributing device is usable if the contributing device is not in a WAN LOCKOUT state |
| P12 | WAN bandwidth of this contributing device is usable if the contributing device passes a WAN throughput test |

Zero, one or any appropriate combination of the example pooling configurations parameters from Table 1, and/or any other pooling configuration parameter(s), can be specified for a contributing device during enrollment as performed by the device enroller 210. For example, and with reference to Table 1, the example pooling configuration parameter P1 can be used to specify that an enrolled contributing device's available (e.g., idle) WAN bandwidth can be included in the WAN bandwidth pool if one or more, or all, of the other contributing devices enrolled and registered with the pooling router 105 are in an OFF state. The example pooling configuration parameter P2 can be used to specify that an enrolled contributing device's available WAN bandwidth can be included in the WAN bandwidth pool if one or more, or all, of the other contributing devices enrolled and registered with the pooling router 105 are in an ON state. The example pooling configuration parameter P3 can be used to specify that an enrolled contributing device's available WAN bandwidth can be included in the WAN bandwidth pool if one or more, or all, of the other contributing devices enrolled and registered with the pooling router 105 have met or exceeded their WAN packet limits, where the limits can be specified by a user during enrollment, selectable by the user during enrollment, signaled by the contributing device, etc. The example pooling configuration parameter P4 can be used to specify that an enrolled contributing device's available WAN bandwidth can be included in the WAN bandwidth pool if one or more, or all, of the other contributing devices enrolled and registered with the pooling router 105 have met or exceeded their WAN throughput capacities, where the capacities can be specified, selectable, signaled, etc.

The example pooling configuration parameter P5 can be used to specify that an enrolled contributing device's available WAN bandwidth can be included in the WAN bandwidth pool if the contributing device's WAN packet latency is within a limit, where the limit can be specified, selectable, signaled, etc. The example pooling configuration parameter P6 can be used to specify that an enrolled contributing device's available WAN bandwidth can be included in the WAN bandwidth pool if a current time is within a time-of-day range, where the time-of-day range may be specified, selectable, signaled, etc. The example pooling configuration parameter P7 can be used to specify that an enrolled contributing device's available WAN bandwidth can be included in the WAN bandwidth pool if the IP traffic to be routed using the contributing device's available WAN bandwidth meets a priority level, where the limit can be specified, selectable, signaled, etc. The example pooling configuration parameter P8 can be used to specify that an enrolled contributing device's available WAN bandwidth can be included in the WAN bandwidth pool if the contributing device's WAN packet latency is better than WAN packet routing latencies for the other contributing devices.

The example pooling configuration parameter P9 can be used to specify that an enrolled contributing device's available WAN bandwidth can be included in the WAN bandwidth pool if the contributing device's per timeframe WAN packet capacity limit has not been exceeded, where the timeframe and/or the limit may be specified, selectable, signaled, etc. The example pooling configuration parameter P10 can be used to specify that an enrolled contributing device's available WAN bandwidth can be included in the WAN bandwidth pool if the contributing device's per session WAN packet capacity limit has not been exceeded, where the limit may be specified, selectable, signaled, etc. The example pooling configuration parameter P11 can be used to specify that an enrolled contributing device's available WAN bandwidth can be included in the WAN bandwidth pool if the contributing device is not in a WAN LOCKOUT state. For example, the WAN LOCKOUT or similar state may be signaled to the pooling router 105 by the contributing device to indicate that access to the contributing device's WAN bandwidth is currently not permitted. The example pooling configuration parameter P12 can be used to specify that an enrolled contributing device's available WAN bandwidth can be included in the WAN bandwidth pool if the contributing device passes a WAN throughput test.

In some examples, if no pooling configuration parameter is specified for a contributing device, then the pooling router 105 assumes that the available WAN bandwidth associated with the contributing device is available for pooling, by default. In other examples, if no pooling configuration parameter is specified for a contributing device, then the pooling router 105 assumes that the available WAN bandwidth associated with the contributing device is not available for pooling, by default.

The example pooling router 105 of FIG. 2 includes an example bandwidth pooler 220 to register the availability of a contributing device with the pooling router 105 in response to detecting the presence of the contributing device. For example, the bandwidth pooler 220 detects the contributing device when the contributing device becomes communicatively coupled with (e.g., is initially connected to) the router. For example, if the contributing device is a mobile device, the bandwidth pooler 220 may detect the contributing device when it enters a wireless coverage area of the pooling router 105 In some examples, the bandwidth pooler 220 can then compare the stored device identification information (e.g., obtained by the device enroller 210 as described above) with device identification information signaled by the contributing device when it connects to the pooling router 105 to determine whether the contributing device was previously enrolled with the pooling router 105. If the contributing device was previously enrolled, the bandwidth pooler 220 indicates that this contributing device is successfully registered and is available for bandwidth pooling.

After registering the availability of a contributing device, the bandwidth pooler 220 of the illustrated example evaluates any pooling configuration parameter(s) associated with the contributing device (and/or associated with other registered contributing device(s)) to determine whether to include its available WAN bandwidth in the WAN bandwidth pool managed by the pooling router 105. For example, the bandwidth pooler 220 may determine that the available WAN bandwidth for a registered contributing device is to be included in the WAN bandwidth pool if any, some (e.g., a majority) or all of its associated pooling configuration parameters are determined to be valid (e.g., evaluate to TRUE or are satisfied under the present operating conditions). In some examples, the bandwidth pooler 220 may determine that the available WAN bandwidth for a registered contributing device is not to be included in the WAN bandwidth pool if any, some (e.g., a majority) or all of its associated pooling configuration parameters are determined to be invalid (e.g., evaluate to FALSE or are not satisfied under the present operating conditions). In some examples, the bandwidth pooler 220 may also include available WAN bandwidth from other contributing devices (e.g., associated with the same or different WANs, such as the WANs 130A-D) whose pooling configuration parameter(s) are determined to be valid. As described above, the bandwidth pooler 220 can evaluate the pooling configuration parameter(s) associated with the registered contributing device(s) to determine which contributing device(s) are to contribute WAN bandwidth are to be included in the WAN bandwidth pool, for example, whenever the set of registered contributing device(s) changes, whenever allocation of the pooled WAN bandwidth is to be performed for a client device, based on a schedule, at periodic or aperiodic time intervals, etc.

To allocate at least a portion of the pooled WAN bandwidth to client device(s) (e.g., such as one or more of the client devices 140A-D), the example pooling router 105 of FIG. 2 includes an example pooled bandwidth allocator 225. For example, the pooled bandwidth allocator 225 can employ any appropriate load balancing technique, rate limiting technique, bandwidth limiting technique, etc., to determine the portion of the WAN bandwidth pool to be allocated a client device in response to request to route data to/from the client device. In some examples, in response to a request to route data to/from a client device, the pooled bandwidth allocator 225 additionally or alternatively evaluates the pooling configuration parameter(s) associated with the registered contributing device(s) to select WAN bandwidth provided by a particular one or more of the registered contributing devices 125A-D for allocation to the client device. In some examples, the pooled bandwidth allocator 225 additionally or alternatively selects WAN bandwidth agnostically from any one or more of the registered contributing devices based on a random selection scheme, a round-robin selection scheme, etc., as described above.

While an example manner of implementing the pooling router 105 of FIG. 1 has been illustrated in FIG. 2, one or more of the elements, processes and/or devices illustrated in FIG. 2 may be combined, divided, re-arranged, omitted, eliminated and/or implemented in any other way. Further, the example device interface 205, the example device enroller 210, the example bandwidth pooler 220, the example pooled bandwidth allocator 225 and/or, more generally, the example pooling router 105 of FIG. 2 may be implemented by hardware, software, firmware and/or any combination of hardware, software and/or firmware. Thus, for example, any of the example device interface 205, the example device enroller 210, the example bandwidth pooler 220, the example pooled bandwidth allocator 225 and/or, more generally, the example pooling router 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example pooling router 105, the example device interface 205, the example device enroller 210, the example bandwidth pooler 220 and/or the example pooled bandwidth allocator 225 are hereby expressly defined to include a tangible computer readable medium such as a memory, digital versatile disk (DVD), compact disk (CD), Blu-ray Disc™, etc., storing such software and/or firmware. Further still, the example pooling router 105 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example pooling router 105, the example device interface 205, the example device enroller 210, the example bandwidth pooler 220 and/or the example pooled bandwidth allocator 225 are shown in FIGS. 3-6. In these examples, the machine readable instructions represented by each flowchart may comprise one or more programs for execution by a processor, such as the processor 712 shown in the example processing system 700 discussed below in connection with FIG. 7. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 712, but the entire program or programs and/or portions thereof could alternatively be executed by a device other than the processor 712 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 3-6 may be implemented manually. Further, although the example machine readable instructions are described with reference to the flowcharts illustrated in FIGS. 3-6, many other methods of implementing the example pooling router 105, the example device interface 205, the example device enroller 210, the example bandwidth pooler 220 and/or the example pooled bandwidth allocator 225 may alternatively be used. For example, with reference to the flowcharts illustrated in FIGS. 3-6, the order of execution of the blocks may be changed, and/or some of the blocks described may be changed, eliminated, combined and/or subdivided into multiple blocks.

As mentioned above, the example processes of FIGS. 3-6 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3-6 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least"

is used as the transition term in a preamble of a claim, it is open-ended in the same manner as the term "comprising" is open ended. Thus, a claim using "at least" as the transition term in its preamble may include elements in addition to those expressly recited in the claim.

Figure 3:
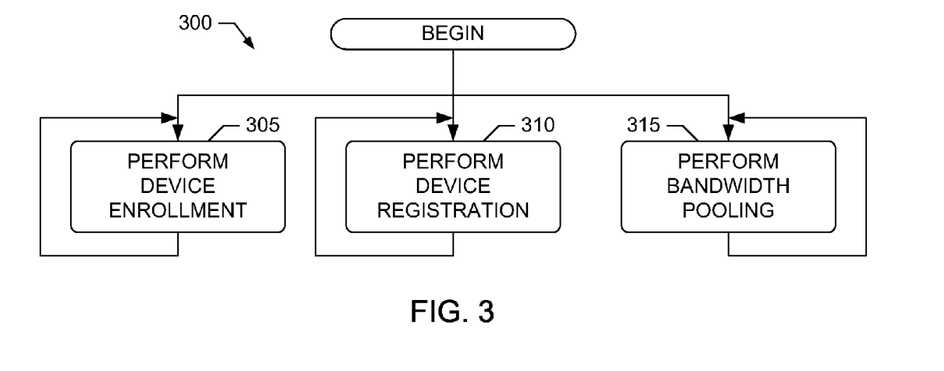
FIG. 3 is a flowchart representative of example machine readable instructions that may be executed to implement the example router of FIG. 2.

Example machine readable instructions 300 that may be executed to implement the example pooling router 105 of FIGS. 1 and/or 2 are represented by the flowchart shown in FIG. 3. With reference to the preceding figures and associated descriptions, the machine readable instructions 300 of FIG. 3, upon execution, cause the pooling router 105 to perform device enrollment processing at block 305, device registration processing at block 310 and bandwidth pooling processing at block 315. For example, the pooling router 105 performs device enrollment processing at block 305 to obtain device identification information and pooling configuration parameter(s) to enroll contributing device(s), as described above. The pooling router 105 performs device registration processing at block 310 to detect and register previously enrolled contributing device(s) for use in performing WAN bandwidth pooling in accordance with the pooling configuration parameter(s), as described above. The pooling router 105 performs bandwidth pooling processing at block 315, in accordance with the pooling configuration parameter(s), to pool available WAN bandwidth accessible via the registered contributing device(s) and to allocate the pooled WAN bandwidth to client device(s), as described above. The processing at blocks 305, 310 and 315 can be performed in parallel, in serial, or any combination thereof (e.g., with some processing in parallel and some processing in serial).

Figure 4:
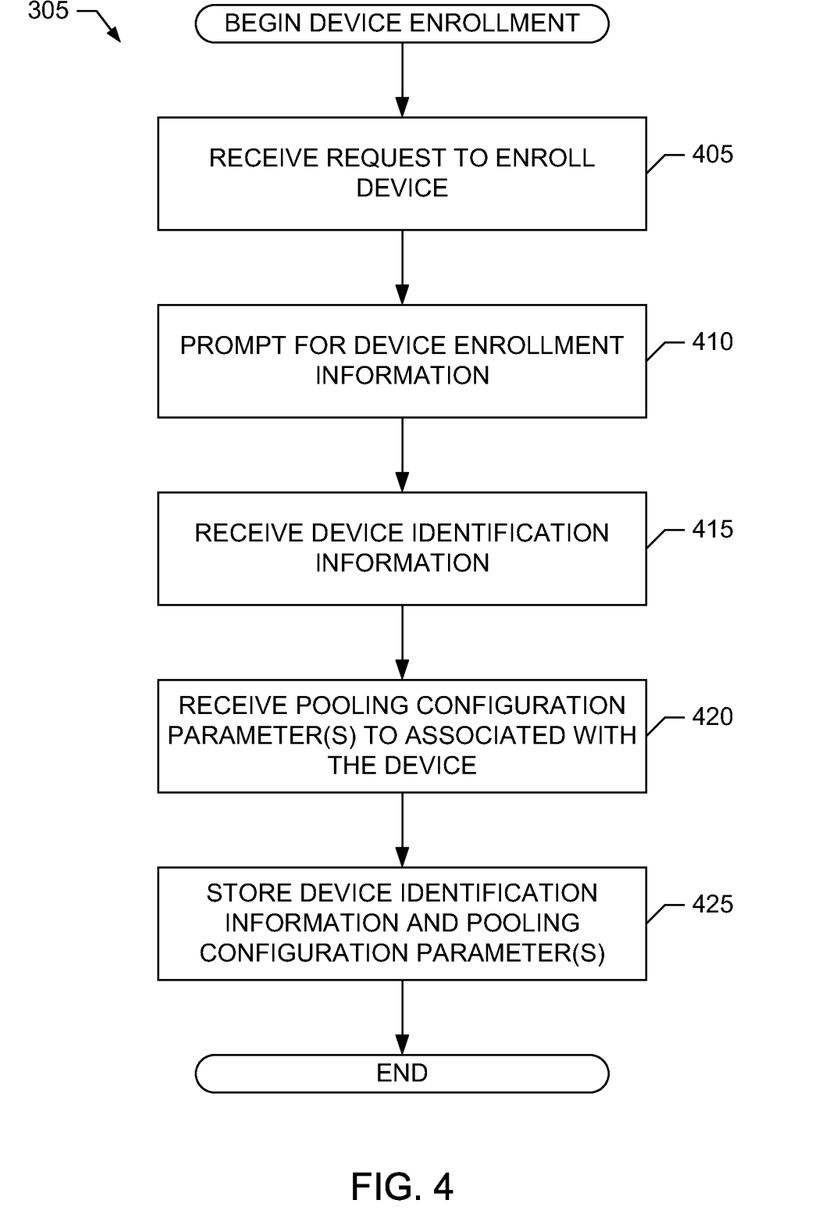
FIG. 4 is a flowchart representative of example machine readable instructions that may be executed to perform device enrollment in the example router of FIG. 2 and/or used to implement at least a portion of the example machine readable instructions of FIG. 3.

Example machine readable instructions 305 that may be executed to perform the device enrollment processing at block 305 of FIG. 3 to implement the example pooling router 105 of FIGS. 1 and/or 2 are represented by the flowchart shown in FIG. 4. With reference to the preceding figures and associated descriptions, the machine readable instructions 305 of FIG. 4 begin execution at block 405 at which the device enroller 210 of the pooling router 105 receives a request to enroll a contributing device, such as one of the contributing devices 125A-D, with the pooling router 105, as described above. At block 410, the device enroller 210 issues one or more prompts (e.g., via a GUI interface displayed locally or at a remote device via, for example, a web browser) for device enrollment information to be associated with the contributing device. At block 415, the device enroller 210 receives device identification information for the contributing device in response to the prompt(s), as described above. At block 420, the device enroller 210 receives one or more pooling configuration parameters to be associated with the contributing device, as described above. At block 425, the device enroller 210 stores the device identification information received at block 415 and the pooling configuration parameter(s) received at block 420 in the pooling configuration storage 215 of the pooling router 105 for association with the contributing device, as described above.

Figure 5:
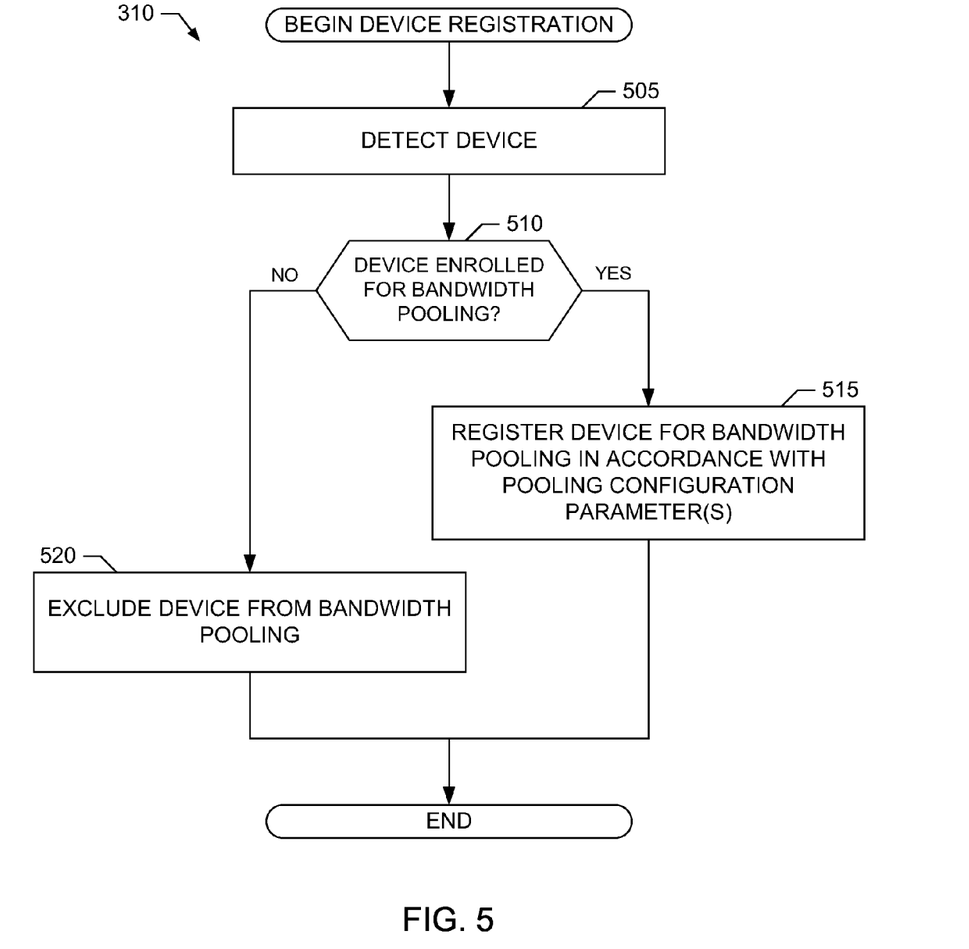
FIG. 5 is a flowchart representative of example machine readable instructions that may be executed to perform device registration in the example router of FIG. 2 and/or used to implement at least a portion of the example machine readable instructions of FIG. 3.

Example machine readable instructions 310 that may be executed to perform the device registration processing at block 310 of FIG. 3 to implement the example pooling router 105 of FIGS. 1 and/or 2 are represented by the flowchart shown in FIG. 5. With reference to the preceding figures and associated descriptions, the machine readable instructions 310 of FIG. 5 begin execution at block 505 at which the device interface 205 of the pooling router 105 connects with a device, such as one of the contributing devices 125A-D, and the bandwidth pooler 220 of the pooling router 105 detects that the device has connected with the device interface 205, as described above. At block 510, the bandwidth pooler 220 determines whether the device is a contributing device that has been enrolled previously with the pooling router 105 for WAN bandwidth pooling. For example, at block 510, the bandwidth pooler 220 may compare device identification information provided by the device detected at block 505 with stored device identification information obtained from a previous device enrollment procedure to determine whether the detected device has been enrolled, as described above.

If the bandwidth pooler 220 determines that the detected device has been enrolled and, thus, is a valid contributing device (block 510), then at block 515, the bandwidth pooler 220 registers the contributing device for possible WAN bandwidth pooling in accordance with the stored pooling configuration parameter(s) that have been associated with the contributing device (and possibly other contributing devices) during previous enrollment procedure(s), as described above. However, if the bandwidth pooler 220 determines that the detected device has not been enrolled and, thus, is not a valid contributing device (block 510), then at block 520, the bandwidth pooler 220 excludes the device detected at block 505 from WAN bandwidth pooling.

Figure 6:
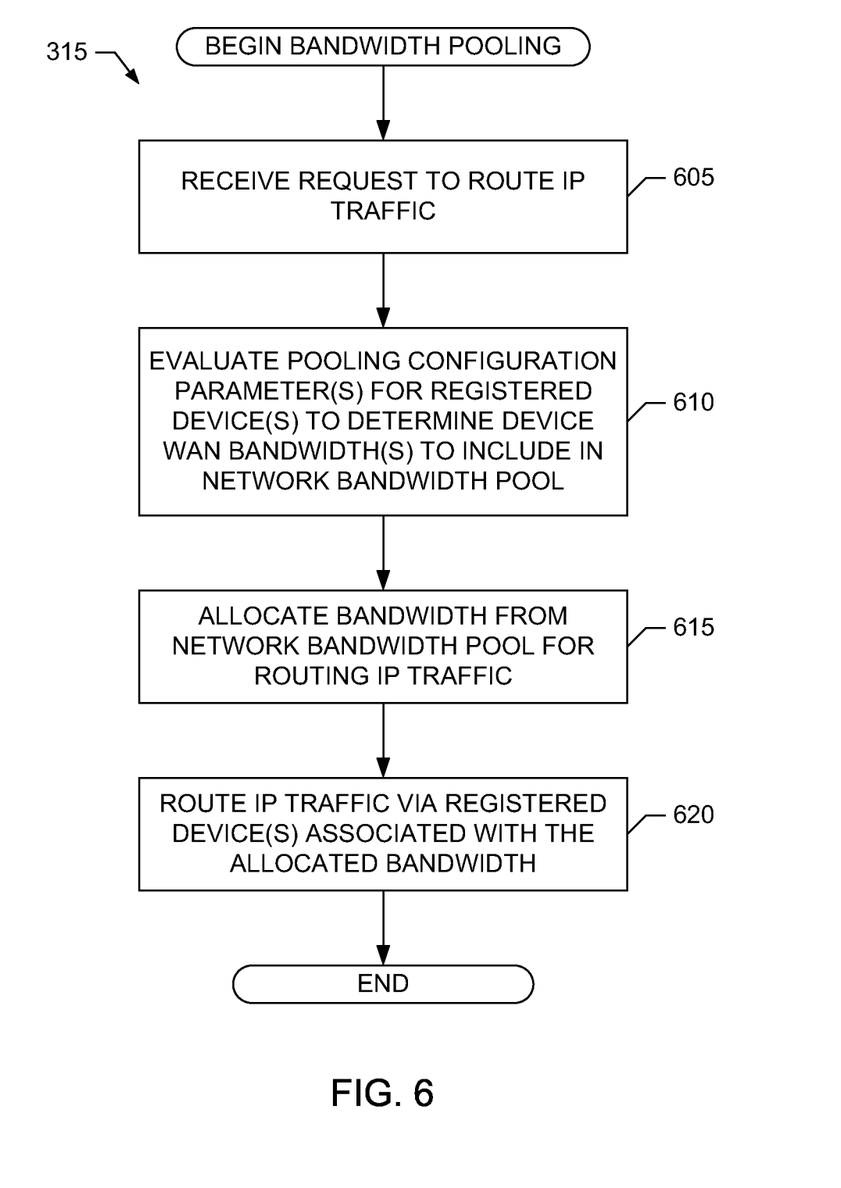
FIG. 6 is a flowchart representative of example machine readable instructions that may be executed to perform bandwidth pooling in the example router of FIG. 2 and/or used to implement at least a portion of the example machine readable instructions of FIG. 3.

Example machine readable instructions 315 that may be executed to perform the bandwidth pooling processing at block 315 of FIG. 3 to implement the example pooling router 105 of FIGS. 1 and/or 2 are represented by the flowchart shown in FIG. 6. With reference to the preceding figures and associated descriptions, the machine readable instructions 315 of FIG. 6 begin execution at block 605 at which the bandwidth pooler 220 of the pooling router 105 receives (e.g., via the device interface 205 of the pooling router 105) a request to route IP traffic to or from a client device, such as one of the client devices 140A-D. The routing request may be received directly from the client device or indirectly, for example, via the LAN bridge 115.

At block 610, the bandwidth pooler 220 evaluates the stored pooling configuration parameter(s) for the contributing devices(s) that are registered with the pooling router 105 to determine which registered contributing device(s) are to contribute available (e.g., idle) WAN bandwidth to the WAN bandwidth pool, as described above. As also described above, the pooling configuration parameter(s) enable available WAN bandwidth from different contributing devices to be prioritized based on different criteria (e.g., such as based on whether packet capacity limit(s) for certain contributing device(s) are or will be exceeded, which could incur increased usage fees; based on whether throughput capacity and/or packet latency limit(s) for certain contributing device(s) are or will be exceeded, which could decrease performance; based on certain time(s) of day during which usage charges may increase/decrease for different contributing device(e), etc.).

At block 615, the pooled bandwidth allocator 225 of the pooling router 105 allocates, as described above, at least a portion of the WAN bandwidth pool determined at block 610 to the client device associated with the routing request received at block 605. At block 620, the pooled bandwidth allocator 225 causes IP traffic for the client device to be routed via the registered contributing device(s) (e.g., such as one or more of the contributing devices 125A-D) whose available WAN bandwidth(s) are included in the portion of the WAN bandwidth pool allocated to the client device at block 615.

Figure 7:
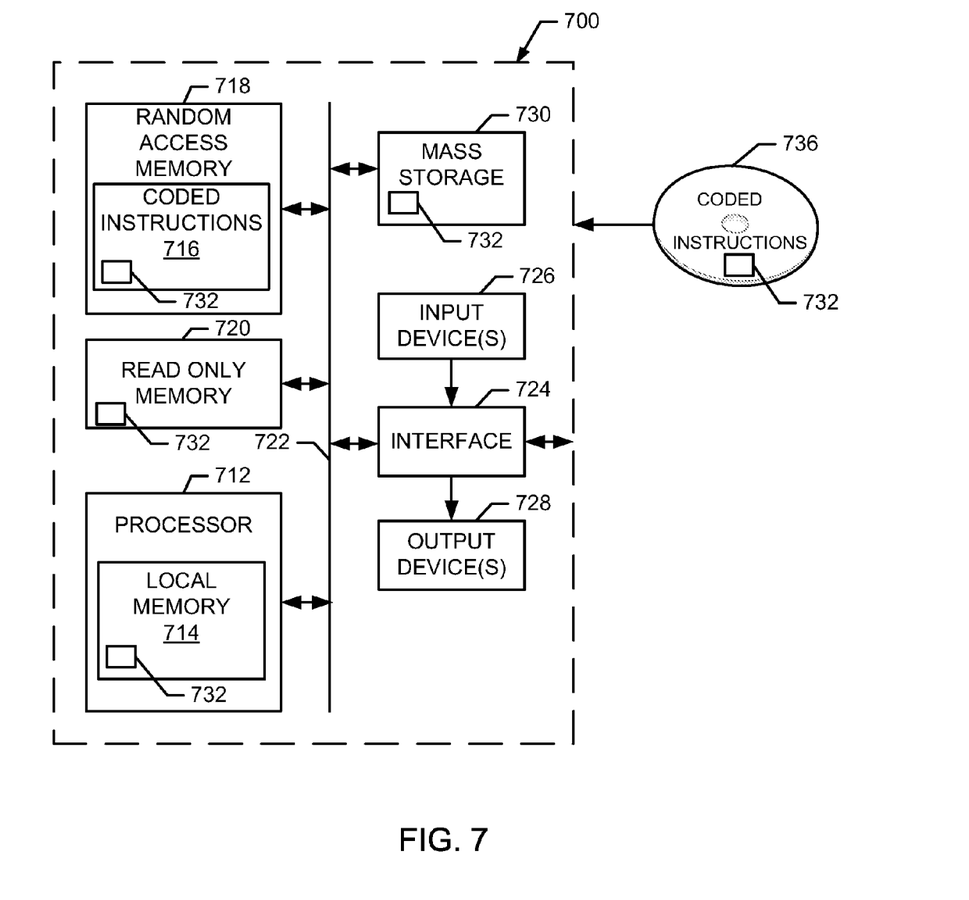
FIG. 7 is a block diagram of an example processing system that may execute the example machine readable instructions of FIGS. 3-5 and/or 6 to implement the example router of FIG. 2 and/or the example system of FIG. 1.

FIG. 7 is a block diagram of an example processing system 700 capable of executing the instructions of FIGS. 3-6 to implement the example pooling router 105, the example device interface 205, the example device enroller 210, the example bandwidth pooler 220 and/or the example pooled bandwidth allocator 225 of FIGS. 1-2. The processing system 700 can be, for example, a router, a gateway, a bridge, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, or any other type of computing device.

The system 700 of the instant example includes a processor 712. For example, the processor 712 can be implemented by one or more microprocessors and/or controllers from any desired family or manufacturer. The processor 712 includes a local memory 714, and executes coded instructions 716 present in the local memory 714 and/or in another memory device.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is controlled by a memory controller.

The processing system 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 700 also includes one or more mass storage devices 730 for storing machine readable instructions and data. Examples of such mass storage devices 730 include floppy disk drives, hard drive disks, compact disk drives and digital versatile disk (DVD) drives. In some examples, the mass storage device 730 may implement the pooling configuration storage 215. Additionally or alternatively, in some examples the volatile memory 718 may implement the pooling configuration storage 215.

Coded instructions 732 corresponding to the instructions of FIGS. 3-6 may be stored in the mass storage device 730, in the volatile memory 718, in the non-volatile memory 720, in the local memory 714 and/or on a removable storage medium, such as a CD or DVD 736.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method for network bandwidth pooling, the method comprising:

registering, at a router, availability of a first device, the first device to provide access to first wide area network bandwidth provided by a first wide area network;

after registering the availability of the first device, determining whether to include the first wide area network bandwidth in a network bandwidth pool accessible to a second device via the router based on whether an operating condition associated with a pooling configuration parameter in a set of pooling configuration parameters configured at the router for the first device is determined to be satisfied, respective ones of the set of the pooling configurations specifying respective different operating conditions under which the first wide area network bandwidth accessible via the first device is permitted to be included in the network bandwidth pool accessible to the second device via the router, the network bandwidth pool including second wide area network bandwidth accessible via a third device registered with the router, the third device being different from the first device; and allocating at least a portion of the network bandwidth pool to route Internet protocol traffic associated with the second device.

2. The method as defined in claim 1, wherein the second wide area network bandwidth is provided by a second wide area network different from the first wide area network.

3. The method as defined in claim 1, further comprising, after registering the availability of the first device, not including the first network bandwidth in the network bandwidth pool when the operating condition associated with the pooling configuration parameter is determined to not be satisfied.

4. The method as defined in claim 1, further comprising enrolling the first device with the router before the router registers the availability of the first device, wherein enrolling the first device comprises:
   storing identification information to identify the first device; and
   storing the set of the pooling configuration parameters configured for the first device.

5. The method as defined in claim 1, wherein the pooling configuration parameter specifies that the first wide area network bandwidth accessible via the first device is to be included in the network bandwidth pool if the third device at least one of (1) is not registered with the router and (2) is determined to be in an off state.

6. The method as defined in claim 1, wherein the pooling configuration parameter specifies that the first wide area network bandwidth accessible via the first device is to be included in the network bandwidth pool if the third device is registered with the router and is determined to be in an on state.

7. The method as defined in claim 1, wherein the pooling configuration parameter specifies that the first wide area network bandwidth accessible via the first device is to be included in the network bandwidth pool if the third device has exceeded a number of packets limit associated with the third device.

8. The method as defined in claim 1, wherein the pooling configuration parameter specifies that the first wide area network bandwidth accessible via the first device is to be included in the network bandwidth pool if the third device has at least met a throughput capacity limit associated with the third device.

9. The method as defined in claim 1, wherein the pooling configuration parameter specifies that the first wide area network bandwidth accessible via the first device is to be included in the network bandwidth pool if packet routing latency associated with the first device is at least one of (1) within an acceptable limit and (2) better than packet routing latency associated with the third device.

10. The method as defined in claim 1, wherein the pooling configuration parameter specifies that the first wide area network bandwidth accessible via the first device is to be included in the network bandwidth pool if a current time is within a time-of-day range.

11. The method as defined in claim 1, wherein the pooling configuration parameter specifies that the first wide area network bandwidth accessible via the first device is to be included in the network bandwidth pool if the Internet protocol traffic to be routed for the second device meets a priority level.

12. The method as defined in claim 1, wherein the pooling configuration parameter specifies that the first wide area network bandwidth accessible via the first device is to be included in the network bandwidth pool if at least one of (1) a per timeframe packet capacity limit associated with the first device has not been exceeded and (2) a per session packet capacity limit associated with the first device has not been exceeded.

13. The method as defined in claim 1, wherein the pooling configuration parameter specifies that the first wide area network bandwidth accessible via the first device is to be included in the network bandwidth pool if the first device passes a throughput test.

14. A tangible machine readable medium comprising machine readable instructions which, when executed, cause a router to perform operations comprising:
   registering availability of a first device, the first device to provide access to first wide area network bandwidth provided by a first wide area network;
   after the availability of the first device is registered, determining whether to include the first wide area network bandwidth in a network bandwidth pool accessible to a second device via the router based on whether an operating condition associated with a pooling configuration parameter in a set of pooling configuration parameters configured at the router for the first device is determined to be satisfied, respective ones of the set of the pooling configurations specifying respective different operating conditions under which the first wide area network bandwidth accessible via the first device is permitted to be included in the network bandwidth pool accessible to the second device via the router, the network bandwidth pool including second wide area network bandwidth accessible via a third device registered with the router, the third device being different from the first device; and
   allocating at least a portion of the network bandwidth pool to route Internet protocol traffic associated with the second device.

15. The tangible machine readable medium as defined in claim 14, wherein the second wide area network bandwidth is provided by a second wide area network different from the first wide area network.

16. The tangible machine readable medium as defined in claim 14, wherein the operations further comprise, after the availability of the first device is registered, not including the first network bandwidth in the network bandwidth when the pooling configuration parameter is determined to not be satisfied.

17. The tangible machine readable medium as defined in claim 14, wherein the operations further comprise, before the availability of the first device is registered:
   storing identification information to identify the first device; and
   storing the set of the pooling configuration parameters configured for the first device to enroll the first device with the router.

18. A router comprising:
   a processor to execute instructions to perform operations comprising:
      registering availability of a first device that is to provide access to first wide area network bandwidth provided by a first wide area network;
      after the availability of the first device is registered, determining whether to include the first wide area network bandwidth in a network bandwidth pool accessible to a second device via the router based on whether an operating condition associated with a pooling configuration parameter in a set of pooling configuration parameters configured for the first device is determined to be satisfied, respective ones of the set of the pooling configurations specifying respective different operating conditions under which the first wide area network bandwidth accessible via the first device is permitted to be included in the network bandwidth pool accessible to the second device via the router, the network bandwidth pool including second wide area network bandwidth accessible via a third device registered with the router, the third device being different from the first device; and allocating at least a portion of the network bandwidth pool to route Internet protocol traffic associated with the second device, the second device being communicatively coupled with the router via a local area network; and a memory to store the instructions and the set of the pooling configuration parameters configured for the first device.

19. The router as defined in claim 18, wherein the second wide area network bandwidth is provided by a second wide area network different from the first wide area network.

20. The router as defined in claim 18, wherein the operations further comprise, before the availability of the first device is registered:

storing identification information to identify the first device; and storing the set of the pooling configuration configured for the first device.

\* \* \* \* \*